(12) United States Patent
Teruyama (10) Patent No.: US 6,260,133 B1
(45) Date of Patent: Jul. 10, 2001

(54) PROCESSOR HAVING OPERATING INSTRUCTION WHICH USES OPERATION UNITS IN DIFFERENT PIPELINES SIMULTANEOUSLY

(75) Inventor: Tatsuo Teruyama, Kawasaki (JP)

(73) Assignee: Kabushiki Kaisha Toshiba, Kanagawa-ken (JP)

(*) Notice: Subject to any disclaimer, the term of this patent is extended or adjusted under 35 U.S.C. 154(b) by 0 days.

(21) Appl. No.: 09/246,401

(22) Filed: Feb. 8, 1999

(51) Int. Cl.[7] ....................................................... G06F 9/30
(52) U.S. Cl. ......................... 712/209; 712/43; 712/208; 712/210; 712/214; 712/215; 712/216
(58) Field of Search ........................... 712/200, 203–206, 712/214–218, 241, 32, 42–43, 208–209, 220, 233

(56) References Cited

U.S. PATENT DOCUMENTS

| 5,555,384 | * | 9/1996 | Roberts et al. ....................... 712/216 |
| 5,598,546 | * | 1/1997 | Blomgren .............................. 712/209 |
| 5,627,982 | * | 5/1997 | Hirata et al. .......................... 712/206 |
| 5,867,682 | * | 2/1999 | Witt et al. ............................. 712/210 |
| 5,913,049 | * | 6/1999 | Shiell et al. ........................... 712/215 |
| 6,076,159 | * | 6/2000 | Fleck et al. ............................ 712/241 |
| 6,105,127 | * | 8/2000 | Kimura et al. ........................ 712/215 |

OTHER PUBLICATIONS

U.S. application No. 09/244,443, Agarwal et al., filed Feb. 4, 1999.

* cited by examiner

Primary Examiner—Meng-Al T. An
Assistant Examiner—Wen-Tai Lin
(74) Attorney, Agent, or Firm—Gray Cary Ware & Freidenrich LLP (57) ABSTRACT

An instruction fetch unit 10 issues a normal ALU operating instruction or a wide ALU operating instruction using two operating units to a first pipeline 14. The instruction fetch unit 10 also issues a normal ALU operating instruction to a second pipeline 16. Occasionally, a wide ALU operating instruction using both a first integer unit 20 and a second integer unit 24 to the first pipeline 14 while a normal ALU operating instruction using the second integer unit 24 to the second pipeline 16. In this case, if the normal ALU operating instruction is earlier, then the normal ALU operating instruction is executed preferentially. If the wide ALU operating instruction is earlier, then the wide ALU operating instruction is executed preferentially.

18 Claims, 6 Drawing Sheets

FIG.1

NORMAL ALU OPERATING INSTRUCTION

| 64 BIT | + | 64 BIT | = | 64 BIT |

WIDE ALU OPERATING INSTRUCTION

FIRST OPERATION    | 64 BIT | + | 64 BIT | = | 64 BIT |

SECOND OPERATION   | 64 BIT | + | 64 BIT | = | 64 BIT |

| FIRST VALID BIT | SECOND VALID BIT | FIRST INTERLOCK SIGNAL | SECOND INTERLOCK SIGNAL | FIRST BIT FOR INTERLOCK (OUTPUT) |
|---|---|---|---|---|
| 0 | 0 | × | × | NEW |
| 0 | 1 | × | 0 | NEW |
| 1 | 0 | 0 | 1 | NEW |
| 1 | 1 | 0 | 0 | NEW |
| 0 | 1 | × | 1 | 0 |
| 1 | 0 | 1 | × | 1 |
| 1 | 1 | 1 | 1 | OLD |
| 1 | 1 | 1 | 0 | INVERT(OLD) |
| 1 | 1 | 0 | 1 | INVERT(OLD) |

PROCESSOR HAVING OPERATING INSTRUCTION WHICH USES OPERATION UNITS IN DIFFERENT PIPELINES SIMULTANEOUSLY

TECHNICAL FIELD

This invention relates to a processor, particularly, of a type having an operation instruction which uses operation units in different pipelines simultaneously in a superscalar manner.

BACKGROUND

Various techniques are known for speeding up microprocessors. Among these speeding-up techniques, there is a technique called pipelining. Pipelining is a technique which divides the operation of an instruction into a plurality of stages and sequentially executes divisional parts from a stage to another to perform the instruction.

For example, a single instruction may be divided into four stages, namely, a fetch stage, an instruction decode stage, an execution stage and a write-back stage, and these stages are executed in one clock cycle. For the execution, different stages are executed in an overlapping manner. That is, while the instruction fetch of a single instruction is completed and its instruction decode is executed, the instruction fetch of the next instruction can be executed at the same time. By progressively processing instructions from one stage to another, instructions can be finished every clock cycle.

There is another known technique called "superscalar" for speeding up microprocessors. Superscalar is a technique where hardware from plurality of pipelines executes a plurality of instructions in parallel. When two pipelines are used, it is called two-way. When four pipelines are used, it is called four-way.

Superscalar uses one operating unit for one instruction. Let a processor include a first integer unit and a floating unit in its first pipeline, and a second integer unit and a load store unit in its second pipeline, for example. Assume here that the instruction fetch unit sent the first pipeline an instruction to use the first integer unit and the second pipeline an instruction to use the second integer unit. Then, operation is automatically executed by using the first integer unit and the second integer unit.

The conventional processor, however, cannot use the floating point unit in the first pipeline and the load store unit in the second pipeline while it uses the first integer unit and the second integer unit. That is, the conventional processor does not use its operating units efficiently. Thus, there is a desire for efficient use of various operating units in a processor and realization of a control method therefor.

SUMMARY

It is therefore an object of the invention to provide a processor capable of efficiently using various operating units in different pipelines and to provide a specific control circuit required therefor.

According to the invention, there is provided a processor comprising:
  a first pipeline having a first operating unit for executing a first operation;
  a second pipeline having a second operating unit for executing the same operation as the first operation, and a third operating unit for executing an operation different from the first operation;
  an instruction fetch unit which issues to the first pipeline a first operating instruction to be operated by using one of the operating units in the first pipeline and the second pipeline a second operating instruction to be operated by using the first operating unit in the first pipeline and one of the operating units in the second pipeline, and issues the first operating instruction to the second pipeline; and
  a control circuit activated when the instruction fetch unit issues to the first pipeline the second operating instruction to be operated by using the first operating unit and the second operating unit, and simultaneously issues to the second pipeline the first operating instruction to be operated by using the second operating unit to make control such that the first operating instruction be executed preferentially while holding the second operating instruction in wait if the first operating instruction is issued earlier than the second operating instruction, or the second operating instruction be executed preferentially while holding the first operating instruction in wait if the second operating instruction is issued earlier than the first operating instruction.

There is further provided a processor comprising:
  a first pipeline having a first operating unit for executing a first operation and a second operating unit for executing a second operation;
  a second pipeline having a third operating unit for executing a third operation and a fourth operating unit for executing a fourth operation;
  an instruction fetch unit which issues to one of the first pipeline and the second pipeline a first operating instruction to be operated by using one of the operating units in the first pipeline and the second pipeline and a second operating instruction to be operated by using one of the first operating units in the first pipeline and one of the operating units in the second pipeline, and issues the first operating instruction to the other of the first pipeline and the second pipeline; and
  a control circuit activated when the first operating instruction issued from the instruction fetch unit to one of the first pipeline and the second pipeline and the second operating instruction issued from the instruction fetch unit to the other of the first pipeline and the second pipeline need a common operating unit to make control such that the first operating instruction be executed preferentially while holding the second operating instruction in wait if the first operating instruction is issued earlier than the second operating instruction, or the second operating instruction be executed preferentially while holding the first operating instruction in wait if the second operating instruction is issued earlier than the first operating instruction.

There is further provided a processor comprising:
  a first pipeline having a first operating unit for executing a first operation;
  a second pipeline having a second operating unit for executing the same operation as the first operation, and a third operating unit for executing an operation different from the first operation;
  an instruction fetch unit which issues to the first pipeline a first operating instruction to be operated by using one of the operating units in the first pipeline and the second pipeline and a second operating instruction to be operated by using the first operating unit in the first pipeline and one of the operating units in the second pipeline, and issues the first operating instruction to the second pipeline; and a control circuit activated when the instruction fetch unit issues to the first pipeline the second operating instruction to be operated by using the first operating unit and the second operating unit, and simultaneously issues to the second pipeline the first operating instruction to be operated by using the second operating unit to make control such that one of the first operating instruction and the second operating instruction is held in wait while preferentially executing the other.

DETAILED DESCRIPTION

The present invention is directed to a processor capable of executing a normal ALU operating instruction and a wide ALU operating instruction, to provide a control circuit particularly for use when the normal ALU operating instruction and the wide ALU operating instruction need to use a common operating unit. An embodiment of the invention is explained below with reference to the drawings.

Figure 1:
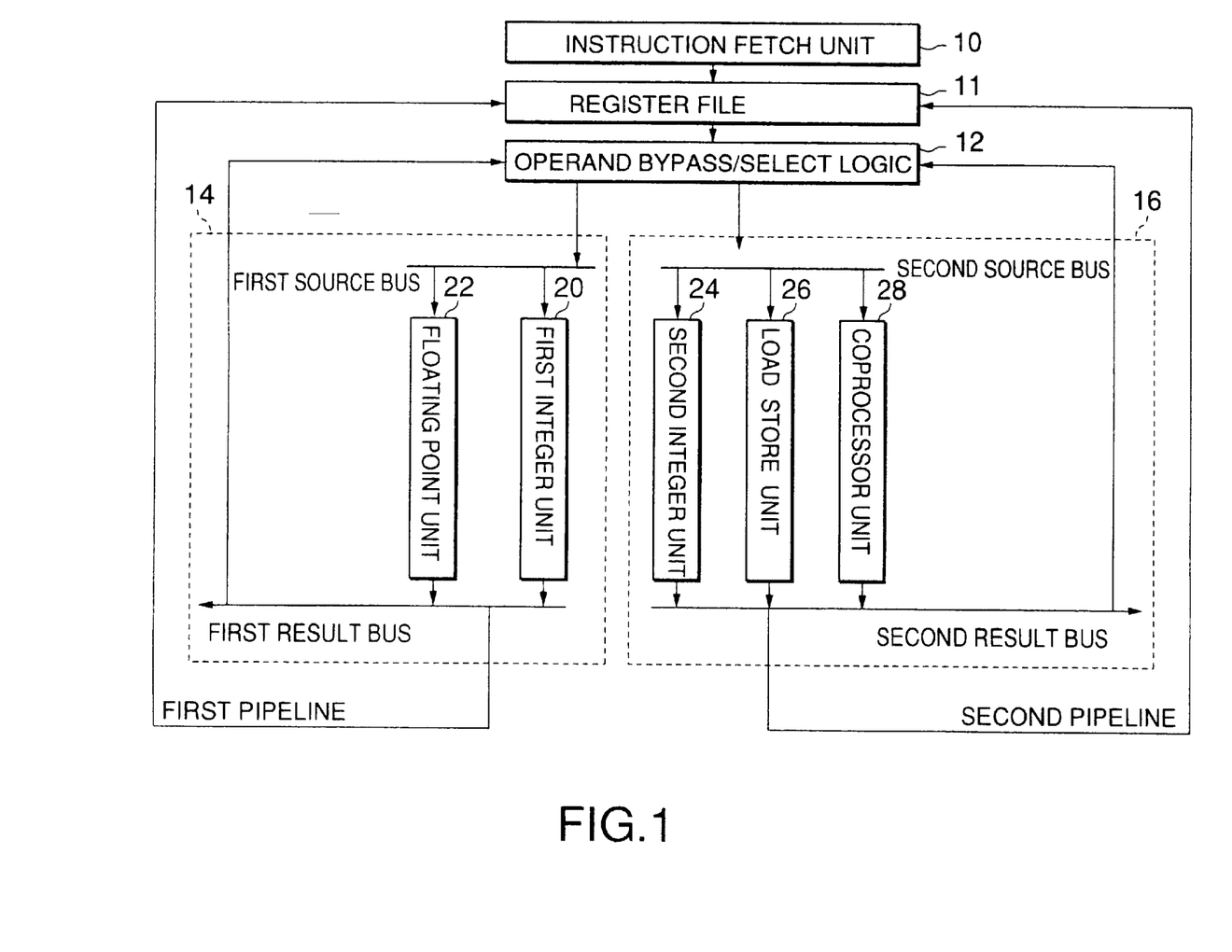
FIG. 1 is a diagram schematically illustrating a general construction of a processor according to an embodiment of the invention, mainly remarking its operand system.
Figure 2:
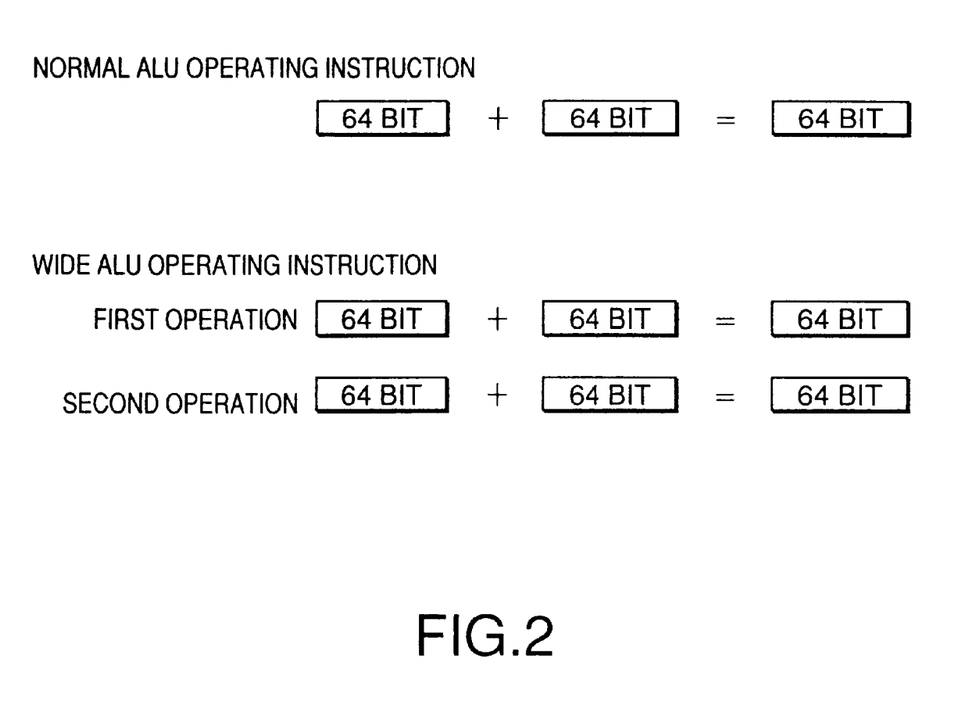
FIG. 2 is a diagram illustrating contents of a normal ALU operating instruction and a wide ALU operating instruction executed by the processor according to the embodiment.

First referring to FIGS. 1 and 2, the entire structure of the processor according to the embodiment is explained. FIG. 1 shows the processor according to the embodiment in its entire hardware structure, while FIG. 2 is a diagram illustrating contents of a normal ALU operating instruction and a wide ALU operating instruction.

As shown in FIG. 1, the processor according to the embodiment includes an instruction fetch unit 10, register file 11, operand bypass/select logic 12, first pipeline 14, and second pipeline 16. That is, the processor according to the embodiment is a two-way superscalar.

The first pipeline 14 includes a first integer unit 20 and a floating point unit 22 as its operation units. The second pipeline 16 includes a second integer unit 24, a load store unit 26 and a coprocessor unit 28 as its operating units.

The first integer unit 20 and the second integer unit 24 are operating units for integer operations. The floating point unit 22 is an operating unit for floating point operations. The load store unit 26 is an operating unit for loading or storing data. The coprocessor unit 28 is an operating unit for operation of mathematical functions such as trigonometric functions or exponential functions.

The processor has normal ALU (arithmetic logic unit) operating instructions and wide ALU operating instructions. As shown in FIG. 2, in case of normal ALU operating instructions, a single instruction leads to operation of 64 bits and 64 bits to obtain an operation result of 64 bits, for example. Therefore, a normal ALU operating instruction is carried out by using a single operating unit.

In case of wide ALU operating instructions, a single instruction invites two operations. That is, a single wide ALU operating instruction causes two operations to be executed simultaneously each for operation of 64 bits and 64 bits and for an operation result of 64 bits. Therefore, a wide ALU operating instruction is operated by using two operating units.

As shown in FIG. 1, two instructions are issued simultaneously from the instruction fetch unit 10. Prior to issue of an instruction, the instruction fetch unit 10 checks which operating unit can execute the fetched instruction.

That is, it checks whether the floating point unit 22 can execute it, first and second integer units 20, 24 can execute it, the load store unit 26 can execute it, or the coprocessor unit 28 can execute it. Then, the instruction fetch unit 10 sends the instruction to an appropriate pipeline. That is, if the instruction can be executed by the floating point unit 22, then the unit 10 deliver it to the first pipeline 14. If the instruction can be executed by the load store unit 26 or coprocessor unit 28, the unit 10 delivers it to the second pipeline 16. If the instruction can be executed by the first integer unit 20 or the second integer unit 24, the unit 10 delivers it to the first pipeline 14 or the second pipeline 16, taking availability of pipelines and the kind of the paired instructions into consideration.

The embodiment, however, is configured such that a wide ALU operating instruction is given only to the first pipeline 14 and not to the second pipeline 16. In contrast, a normal ALU operating instruction can be issued to any of the first pipeline 14 and the second pipeline 16. The processor according to the invention is designed to execute instruction in their order.

With reference to two instructions issued from the instruction fetch unit 10, operands necessary for executing them are read out from a register file 11. Then, these two instructions are sent to the first pipeline 14 and the second pipeline 16, and operands for respective instructions are sent to the first pipeline 14 and the second pipeline 16.

More specifically, the operands read out from the register file 11 are sent through an operand bypass/select logic 12 to a first source bus and a second source bus, and then reach respective operating units.

Results of operations by respective operating units are put on a first result bus and a second result bus, respectively, and then written in the register file 11, or sent to the operand bypass/select logic 12 via operand bypasses.

Figure 3:
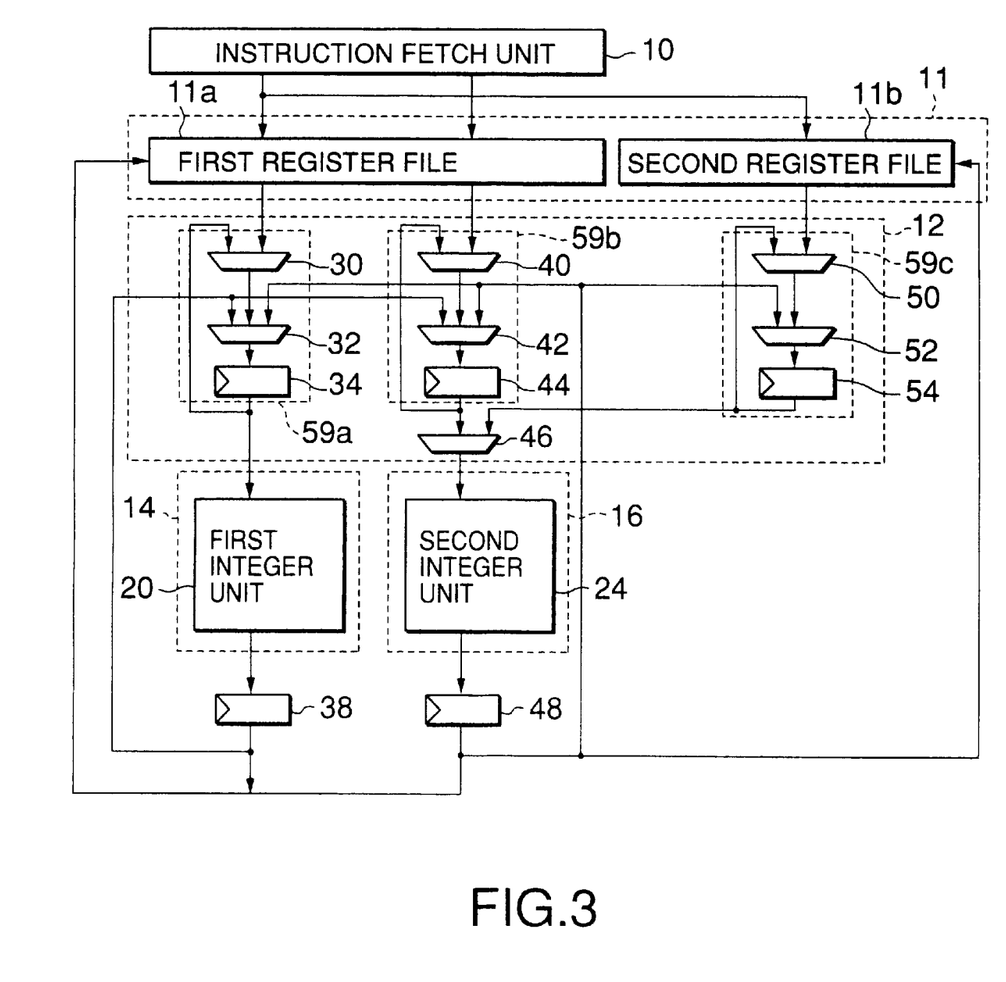
FIG. 3 is a diagram for explaining a control circuit for controlling the operand system in the processor shown in FIG. 1.

That is the entire structure and behavior of the processor according to the first embodiment. The control of an operating instruction by the processor can be divided to the control of the instruction system in the operating instruction and the control of the operand system which is data for the operating instruction. With reference to FIG. 3, the control of the operand (data system) is first explained below in detail.

FIG. 3 shows how the operand is sent to the first integer unit 20 and the second integer unit 16 according to the embodiment. FIG. 3 omits illustration of the floating point unit 22 in the first pipeline 14, load store unit 26 and coprocessor unit 28 in the second pipeline 16 because a wide ALU operating instruction in the embodiment is assumed to be an instruction using the first integer unit 20 and the second integer unit 24.

As shown in FIG. 3, the register file 11 includes a first register file 11a and a second register file 11b. The first register file 11a holds operands for normal ALU operating instructions. The second register file 11b holds a part of operands for wide ALU operating instructions.

When instructions are issued from the instruction fetch unit 10 to the first pipeline 14 and the second pipeline 16, they are also sent from the instruction fetch unit 10 to the register file 11a. More specifically, the instructions for the first pipeline and the second pipeline are sent from the instruction fetch unit 10 to the first register file 11a, and at the same time, the instruction for the first pipeline is sent to the second register file 11b. Accordingly, operands for respective instructions are read from the first register file 11a and the second register file 11b.

Interposed between the first register file 11a and the first integer unit 20 are a hold multiplexer 30, bypass multiplexer 32 and first flip-flop 34. In the destination of outputs from the first integer unit 20, a second flip-flop 38 is provided.

Interposed between the first register file 11a and the second integer unit 24 are a hold multiplexer 40, bypass multiplexer 42, first flip-flop 44 and wide multiplexer 46. In the destination of output from the second integer unit 24, a second flip-flop 48 is provided.

Interposed between the second register file 11b and the wide multiplexer 46 are a hold multiplexer 50, bypass multiplexer 52 and flip-flop 54.

The hold multiplexers 30, 40 and 50 are used for holding operands while pipelines are stalled. When they hold operands, they select the feed back loop to output therefrom. When they hold no operand, they select the path from the register file 11 to output therefrom.

The bypass multiplexers 32, 42, 52 are used to form operand bypasses. That is, the bypass multiplexers 32, 42, 52 are provided to enable the use of data (bypass data), being results of operations by the first integer unit 20 and the second integer unit 24, even when these results are not written in the register file 11 immediately after being obtained.

These hold multiplexers, 30, 40, 50, bypass multiplexers 32, 42, 52, first flip-flops 34, 44, 54, and wide multiplexer 46 make up the operand bypass/select logic 12 which is the control circuit for controlling the operand system according to the embodiment.

The hold multiplexer 30, bypass multiplexer 32 and first flip-flop 34 make up a hold output circuit 59a which can select which of the operand output from the first register file or the operand held therein should be output. The hold multiplexer 40, bypass multiplexer 42 and first flip-flop 44 make up a hold output circuit 59b which can select which of the operand output from the first register file or the operand held therein should be output. The hold multiplexer 50, bypass multiplexer 52 and first flip-flop 54 make up a hold output circuit 59c which can select which of the operand output from the second register file or the operand held therein should be output.

These hold output circuits 59a through 59c each hold or output two operands. That is, in the example shown in FIG. 2, the hold output circuits 59a to 59c each hold or output two operands of 64 bits. FIG. 3 shows two operands by a single line, single multiplexer and single flip-flop for simplicity.

Next referring to FIG. 3, the flow of operands is explained for different cases, namely, where (1) two normal ALU operating instructions have been issued simultaneously, (2) a normal ALU operating instruction and a wide ALU instruction have been issued simultaneously, and the wide ALU operating instruction is the earlier instruction, and (3) a normal ALU operating instruction and a wide ALU operating instruction have been issued simultaneously, and the wide ALU is the later instruction. In the explanation, all of the instructions issued from the instruction fetch unit 10 are assumed to be instructions to be executed by using the first integer unit 20 or the second integer unit 24.

(1) When two normal ALU operating instructions are issued simultaneously:

For instructions issued to the first pipeline 14 and the second pipeline 16, operands for respective instructions are read out from the first register file 11a. These two pairs of operands (four operands in total) are sent through the hold multiplexers 30, 40, and bypass multiplexers 32, 42, and held in the first flip-flops 34, 44. That is, the hold multiplexers 30, 40 select and output operands from the first register file 11a, and the bypass multiplexers 32, 42 select and output operands output from the hold multiplexers 30, 40.

These two pairs of operands held here are then sent to the first integer unit 20 and the second integer unit 24 simultaneously with instructions (explained later), and are operated upon there. That is, the wide multiplexer 46 selects a pair of operands outputs from the first flip flop 44, which are operands of the first register file 11a, and outputs them to the second integer unit.

(2) When a normal ALU operating instruction and a wide ALU operating instruction are issued simultaneously, and the wide ALU operating instruction is the earlier instruction:

A pair of operands for one of operations pursuant to the wide ALU operating instruction (first operation) are read out from the first register file 11a toward the first pipeline 14. Additionally, a pair of operands for the normal ALU operating instruction are read out from the first register file 11a toward the second pipeline 16. Furthermore, a pair of operands for the other of operations pursuant to the wide ALU operating instruction (second operation) are read out from the second register file 11b toward the second pipeline 16. Therefore, six operands in total are read out from the register file 11.

In the embodiment shown here, the wide ALU operating instruction is given only to the first pipeline 14. Therefore, it is sufficient for the second register file 11b to be supplied only with the instruction issued to the first pipeline.

In this manner, two pairs of operands for two instructions read out from the first register file 11a are sent through the hold multiplexers 30, 40, and the bypass multiplexers 32, 42, and held in the first flip-flops 34, 44. That is, the hold multiplexers 30, 40 select and output operands from the first register file while the bypass multiplexers 32, 42 select and output operands output from the hold multiplexers.

The pair of operands for one instruction read out from the second register file 11b are sent through the hold multiplexer 50 and the bypass multiplexer 52, and held in the first flip-flop 54. That is, the hold multiplexer 50 selects and outputs the operands from the second register file 11b, and the bypass multiplexer 52 selects and outputs the operands from the hold multiplexer 50.

Since the instruction issued to the first pipeline 14 is a wide ALU operating instruction and the earlier instruction, operands for the wide ALU operating instruction are first given to the first integer unit 20 and the second integer unit 24. In greater detail, given to the first integer unit 20 are a pair of operands from the first flip-flop 34. That is, the first integer unit 20 is supplied with the pair of operands read out from the first register file 11a. The second integer unit 24 is supplied with a pair of operands from the first flip-flop 54. That is, given to the second integer unit 24 are the pair of operands read out from the second register file 11b. Thus, the wide multiplexer 46 selects the operands output from the first flip-flop 54, and delivers them to the second integer unit 24.

In this manner, the wide ALU operating instruction is sent to the first integer unit 20 and the second integer unit 24 under no pipeline stall. However, the normal ALU operating instruction must wait its turn due to pipeline stall because the resources cannot be used. That is, although the normal ALU operating instruction is issued to the second pipeline 16, the second integer unit 24 in the second pipeline 16 is under use for execution of the wide ALU operating instruction, and the normal ALU operating instruction cannot use the second integer unit. Therefore, the normal ALU operating instruction is held up until execution of the wide ALU operating instruction is completed.

The pair of operands for the normal ALU operating instruction having caused pipeline stall are fed back from the first flip-flop 44 to the hold multiplexer 40, and held until the next cycle.

The pair of operands for the normal ALU operating instruction held in the hold multiplexer 40 are given to the second integer unit and executed in the next cycle. That is, in the next cycle, the hold multiplexer 40 selects the operands output from the first flip-flop 44, and outputs them to the bypass multiplexer 42. Concurrently, the next instruction is issued to the first pipeline 14, and executed in parallel with the second pipeline 16, if possible. (3) When a normal ALU operating instruction and a wide ALU operating instruction are issued simultaneously, and the wide ALU operating instruction is the later instruction:

In the same manner as the above case (2), a pair of operands (two operands) read out from the first register file 11a for one of operations pursuant to the wide ALU operating instruction (first operation) are sent through the hold multiplexer 30 and the bypass multiplexer 32, and held in the first flip-flop 34. A pair of operands (two operands) read out from the first register file 11a for the normal ALU operating instruction are sent through the hold multiplexer 40 and the bypass multiplexer 42, and held in the first flip-flop 44. A pair of operands (two operands) read out from the second register file 11b for the other of operations pursuant to the wide ALU operating instruction (second operation) are sent through the hold multiplexer 50 and the bypass multiplexer 52, and held in the first flip-flop 54.

Although the instruction issued to the first pipeline 14 is a wide ALU operating instruction, it is the later instruction. Therefore, first given to the second integer unit 24 are the operands for the normal ALU operating instruction. That is, the second integer unit 24 first receives the pair of operands from the first flip-flop 24, which are read out from the first register file 11a. As a result, the wide multiplexer 46 selects the operands output from the first flip-flop 44 and outputs them to the second integer unit 46.

In this manner, the normal ALU operating instruction is sent to the second integer unit 24 under no pipeline stall, but the wide ALU must wait due to pipeline stall because the resources cannot be used. That is, although the wide ALU operating instruction is issued to the first pipeline 14, both the first integer unit 20 and the second integer unit 24 must be used to execute the wide ALU operating instruction. However, since the second integer unit 24 is under use for the normal ALU operating instruction issued earlier, the wide ALU operating instruction cannot use the second integer unit 24. Therefore, the wide ALU operating instruction must wait until execution of the normal ALU operating instruction is completed.

These two pairs of operands (four operands) for the wide ALU operating instruction having caused pipeline stall are held until the next cycle. That is, one pair of operands read out from the first register file 11a is fed back from the first flip-flop 34 to the hold multiplexer 30, and held until the next cycle. One pair of operands read out from the second register file 11b is fed back from the first flip-flop 54 to the hold multiplexer 50 and held until the next cycle.

Then, these two pairs of operands held in the hold multiplexers are given to the first integer unit 20 and the second integer unit 24 and operated upon, respectively, in the next cycle. That is, in the next cycle, the hold multiplexer 30 selects the operand output from the first flip-flop 34 and output them to the bypass multiplexer 32. The hold multiplexer 50 selects the operands output from the first flip-flop 54 and outputs them to the bypass multiplexer 52.

Figure 4:
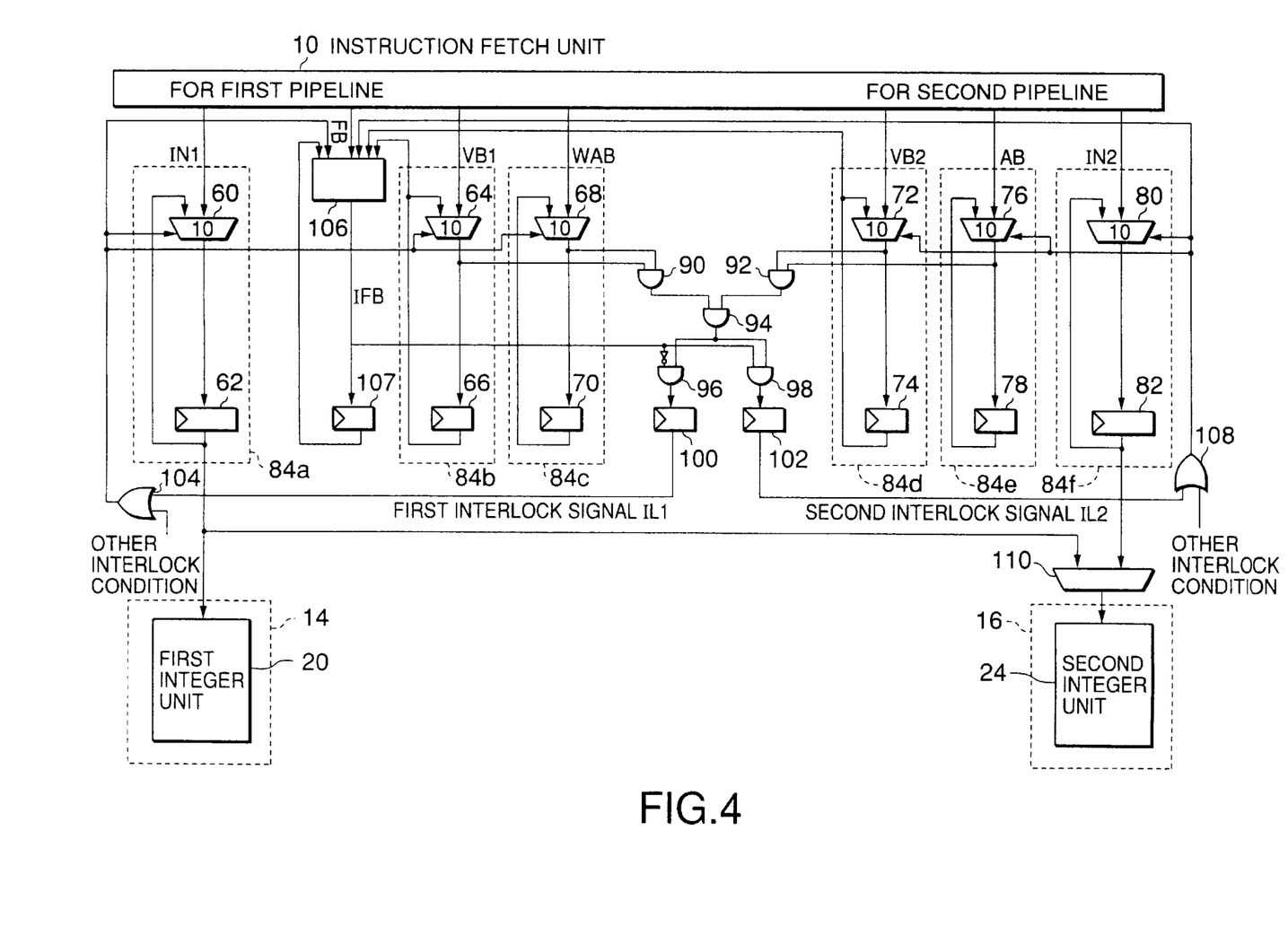
FIG. 4 is a diagram for explaining a control circuit for controlling an instruction system in the processor shown in FIG. 1.
Figure 5:
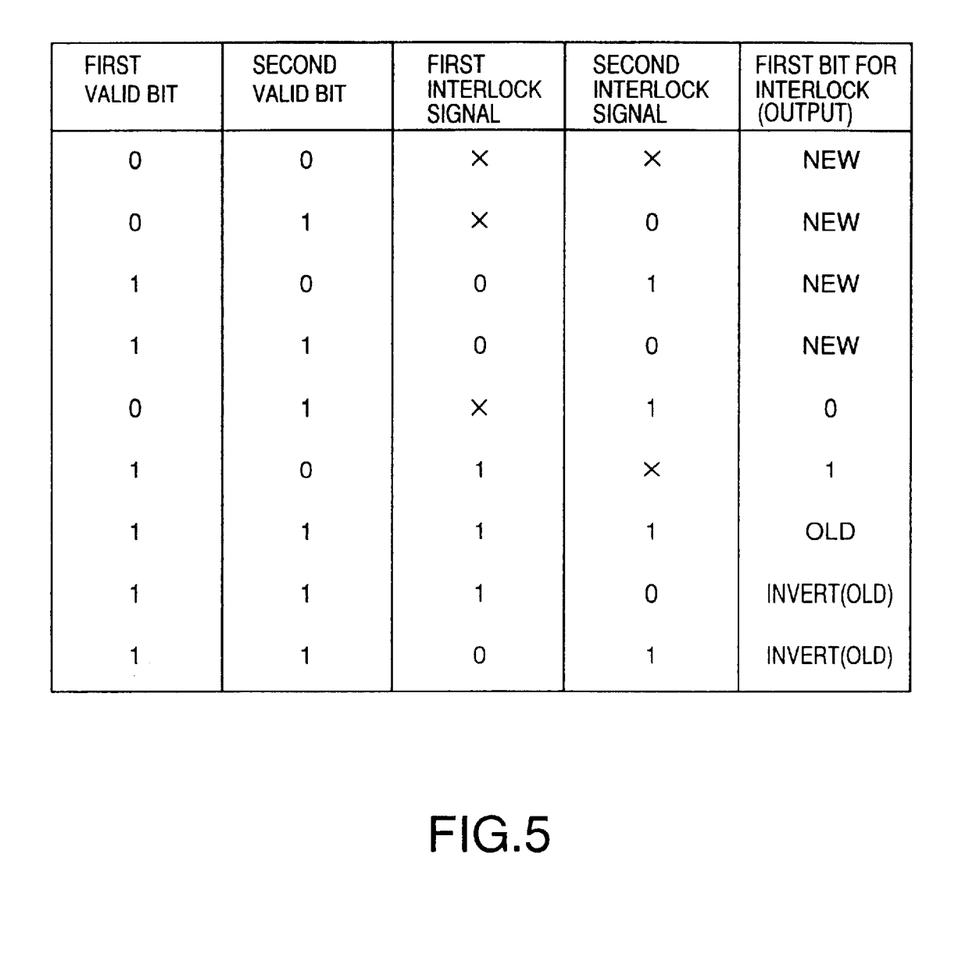
FIG. 5 is a diagram showing behaviors of a state machine shown in FIG. 4, in the form of a truth table.

Next referring to FIGS. 4 and 5, control of the instruction system of operating instructions is explained in detail. FIG. 4 is a diagram for explaining control of the instruction system of the processor according to the same embodiment. In the same manner as FIG. 3, FIG. 4 also omits illustration of the floating point unit 22 in the first pipeline 14, load store unit 26 and coprocessor unit 28 in the second pipeline 16.

As shown in FIG. 4, output from the instruction fetch unit 10 are a wide ALU bit WAB, ALU bit AB, first valid bit VB1, second valid bit VB2, first bit FB, first instruction signal IN1 and second instruction signal IN2.

The wide ALU bit WAB is a bit which is 1 when the instruction fetched by the instruction fetch unit 10 is a wide ALU operating instruction and is 0 when the fetched instruction is not a wide ALU operating instruction (also when it is a normal ALU operating instruction).

The ALU bit AB is a bit which is 1 when the instruction fetched by the instruction fetch unit 10 is a normal ALU operating instruction and is 0 otherwise (also when it is a wide ALU operating instruction).

The first valid bit VB1 is a bit which is 1 when the instruction issued to the first pipeline 14 is an effective instruction and is 0 when it is not an effective instruction. The second valid bit VB2 is a bit which is 1 when the instruction issued to the second pipeline 16 is an effective instruction and is 0 when it is not.

These wide ALU bit WAB, ALU bit AB, first valid bit VB1 and second valid bit VB2 are bit information pre-decoded and generated when the instruction fetch unit 10 fetches instructions.

The first bit FB is a bit indicating the order of instructions issued from the instruction fetch unit 10. That is, it is 1 when the instruction issued to the first pipeline 14 is earlier than the instruction issued to the second pipeline 16, and is 0 in the opposite case.

The first instruction signal IN1 is a signal of an instruction be issued from the instruction fetch unit 10 to the first pipeline 14. The second instruction signal IN2 is a signal of an instruction issued from the instruction fetch unit 10 to the second pipeline 16. The first instruction signal IN1 and second instruction signal IN2 are transferred through a bus of 16 bits or 32 bits, for example.

Here again, the wide ALU operating instruction is issued only to the first pipeline 14. An instruction has a certain bit length whichever it is of a wide ALU operating instruction and a normal ALU operating instruction.

Hold multiplexers 60, 64, 68, 72, 76, 80 and flip-flops 62, 66, 70, 74, 78, 82 are provided for the first instruction signal IN1, first valid bit VB1, wide ALU bit WAB, second valid bit VB2, ALU bit AB and second instruction signal IN2, respectively, and feedback loops are provided individually. These pairs of hold multiplexers 60, 64, 68, 72, 76, 80 and flip-flops 62, 66, 70, 74, 78, 82 make up hold output circuits 84a through 84f for respective signals.

Whether the hold output circuits 84a to 84f output signals held there or new signals depends on a first interlock signal IL1 and a second interlock signal IL2.

That is, when the first interlock signal IL1 is 1, the instruction of the first pipeline 14 encounters pipeline stall, and the hold multiplexers 60, 64, 68 select and output the signal from the feed back loop in the next cycle. When the second interlock signal IL2 is 1, the instruction of the second pipeline 16 encounters pipeline stall, and the hold multiplexers 72, 76, 80 select and output the signal from the feed back loop in the next cycle.

These first interlock signal IL1 and second interlock signal IL2 are generated by the hold output circuits 84a through 84f, AND circuits 90, 92, 94, 96, 98, flip-flops 100, 102 and state machine 106. That is, they make up the interlock signal generating circuit according to the embodiment.

The first interlock signal IL1 is introduced into the hold multiplexers 60, 64, 68 and state machine 106 through an OR circuit 104. The second interlock signal IL2 is introduced into the hold multiplexers 72, 76, 80 and state machine 106 via an OR circuit 108. The OR circuit 104 takes the OR between the first interlock signal IL1 and an interlock condition generated externally to make the final first interlock signal IL1. The OR circuit 108 takes the OR between the second interlock signal IL2 and an interlock condition generated externally to make the final second interlock signal IL2. Data hazards, or the like, as these other interlock conditions.

The state machine 106 is a circuit for generating a first bit for interlock IFB from the first bit FB. The first bit for interlock IFB is input to a flip-flop 107. Even when the first pipeline 14 is under pipeline stall, for example, the state machine 106 inverts the first bit for interlock IFB if the second pipeline 16 is not under pipeline stall. Behaviors of the state machine 106 in form of a table are shown in FIG. 5.

In FIG. 5, the mark x in the first interlock signal IL1 and the second interlock signal IL2 means that it may be either 0 or 1 ("don't care"). When the output of the state machine 106 is "new", it means that the value of the first bit FB given from the instruction fetch unit 10 is output directly as the first bit for interlock IFB. When the output of the state machine 106 is "old", it means that the value of the first bit for interlock IFB of the preceding cycle is output as the first bit for interlock IFB for the next cycle. When the output of the state machine 106 is "invert", it means that the value inverted from the first bit for interlock IFB of the preceding cycle is output as the first bit for interlock IFB for the next cycle.

In the case where two normal ALU operating instructions are issued from the instruction fetch unit 10, the first instruction signal IN1 is given to the first integer unit 20, and the second instruction signal IN2 is given to the second integer unit 24.

In the case where the instruction fetch unit 10 issues a wide ALU operating instruction to the first pipeline 14 and a normal ALU operating instruction to the second pipeline 16, and the wide ALU operating instruction is earlier than the normal ALU operating instruction, the first instruction signal IN1 is given to the first integer unit 20 and the second integer unit 24.

In the case where the instruction fetch unit 10 issues a wide ALU operating instruction to the first pipeline 14 and a normal ALU operating instruction to the second pipeline 16, and the wide ALU operating instruction is later than the normal ALU operating instruction, the second instruction signal IN2 is given to the second integer unit 24.

For the purpose of such selection, a multiplexer 110 is provided at the input side of the second integer unit 24. That is, when the multiplexer 110 preferentially executes the wide ALU operating instruction, it selects the first instruction signal IN1 and outputs it to the second integer unit 24. If it preferentially executes the normal ALU operating instruction, the it selects the second instruction signal IN2 and outputs it to the second integer unit 24.

In the construction explained above, under the condition of the first valid bit VB1 being 1, the second valid bit VB2 being 1, the wide ALU bit WAB being 1, the ALU bit AB being 1, and the first bit for interlock IFB being 0, the first interlock signal IL1 becomes 1. That is, if the wide ALU operating instruction is in the first pipeline 14, the normal ALU operating instruction is in the second pipeline 16, and the normal ALU operating instruction is earlier, then the first interlock signal IL1 is 1, and the wide ALU operating instruction issued to the first pipeline 14 encounters pipeline stall. Therefore, the normal ALU operating instruction is preferentially executed, and the wide ALU operating instruction must wait.

Under the condition with the first valid bit VB1 being 1, second valid bit VB2 being 1, wide ALU bit WAB being 1, ALU bit AB being 1 and first bit for interlock IFB being 1, then the second interlock signal IL2 is 1. That is, under the condition of the wide ALU operating instruction being in the first pipeline 14, the normal ALU operating instruction being in the second pipeline 16, and the wide ALU operating instruction being earlier, then the second interlock signal IL2 is 1, and the normal ALU operating instruction issued to the second pipeline 16 encounters pipeline stall. Therefore, the wide ALU operating instruction is preferentially executed, and the normal ALU operating instruction must wait.

Next referring to FIG. 4, explained below are behaviors in the next cycle after an instruction encounters pipeline stall. Assume here that a wide ALU operating instruction has been given as the first instruction, a normal ALU operating instruction as the second instruction, and a wide ALU operating instruction as the third instruction. Assume also that the first wide ALU operating instruction and the second normal ALU operating instruction have been issued to the first pipeline 14 and the second pipeline 16, respectively, in the first cycle, and the third wide ALU operating instruction has been issued to the first pipeline 14 in the next cycle. Explanation is made as the normal ALU operating instruction issued to the second pipeline 16 caused pipeline stall.

In this case, signals in the second pipeline 16 are held. That is, the second valid bit VB2, ALU bit AB and second instruction signal IN2 in the second pipeline 16 are held by hold output circuits 84d through 84f made up of the hold multiplexers 72, 76, 80 and the flip-flops 74, 78, 82. The second valid bit VB2 and the ALU bit AB held there are used for generating the second interlock signal IL2 for the next cycle.

In the first cycle, since the first wide ALU operating instruction issued to the first pipeline 14 is preferentially executed, pipeline stall does not occur, and the second normal ALU operating instruction issued to the second pipeline causes pipeline stall. Therefore, in the next cycle, a new instruction is supplied from the instruction fetch unit 10 to the first pipeline 14. That is, the instruction fetch unit 10 supplies a new first instruction signal IN1, new first valid bit VB1, and new wide ALU bit WAB. In the example shown here, the third wide ALU operating instruction is supplied in the next cycle from the instruction fetch unit 10 to the first pipeline 14.

As to the first bit for interlock IFB, since only the second pipeline 16 is under pipeline stall, the instruction in the second pipeline has priority in the next cycle. Therefore, as shown in the truth table of FIG. 5, the first bit for interlock IFB is inverted from 1 to 0. That is, the first bit for interlock IFB changes to treat the instruction in the second pipeline 16 as the earlier instruction.

As a result, the second normal ALU operating instruction in the second pipeline is preferentially executed in the next cycle even if the third instruction is a wide ALU operating instruction. That is, in the next cycle, the hold multiplexer 80 selects the input from the feedback loop, and supplies the flip-flop 82 with the normal ALU operating instruction which is the second instruction. Thus, in the next cycle, the normal ALU operating instruction which is the second instruction is preferentially executed over the wide ALU operating instruction which is the third instruction.

As explained above, since the processor according to the embodiment uses wide ALU operating instructions in addition to normal ALU operating instructions, it can use its operating units efficiently to speed up the processing. That is, as shown in FIG. 1, when a wide ALU operating instruction using both the first integer unit 20 and the second integer unit 24 is issued, if the next instruction is a load store instruction using the load store unit 26 and the coprocessor unit 28, the normal ALU operating instruction can be executed together in the first cycle.

Moreover, control is made to preferentially execute an earlier instruction when a wide ALU operating instruction using both the first integer unit 20 and the second integer unit 24 is issued to the first pipeline 14, and a normal ALU operating instruction using the second integer unit 24 is issued to the second pipeline 16. Therefore, instructions can be executed in order.

The invention is not limited to the embodiment shown above, but may involve various changes or modifications. For example, although the embodiment has been explained as issuing wide ALU operating instructions only to the first pipeline 14, it can be modified to issue them to both the first pipeline 14 and the second pipeline 16.

Further, although wide ALU operating instructions used in the embodiment have been explained as using both the first integer unit 20 and the second integer unit 24 which are operating units of the same kind, they may be instructions using two operating units of different types. For example, wide ALU operating instructions may be those which use the first integer unit in the first pipeline and the coprocessor unit 28 in the second pipeline.

Figure 6:
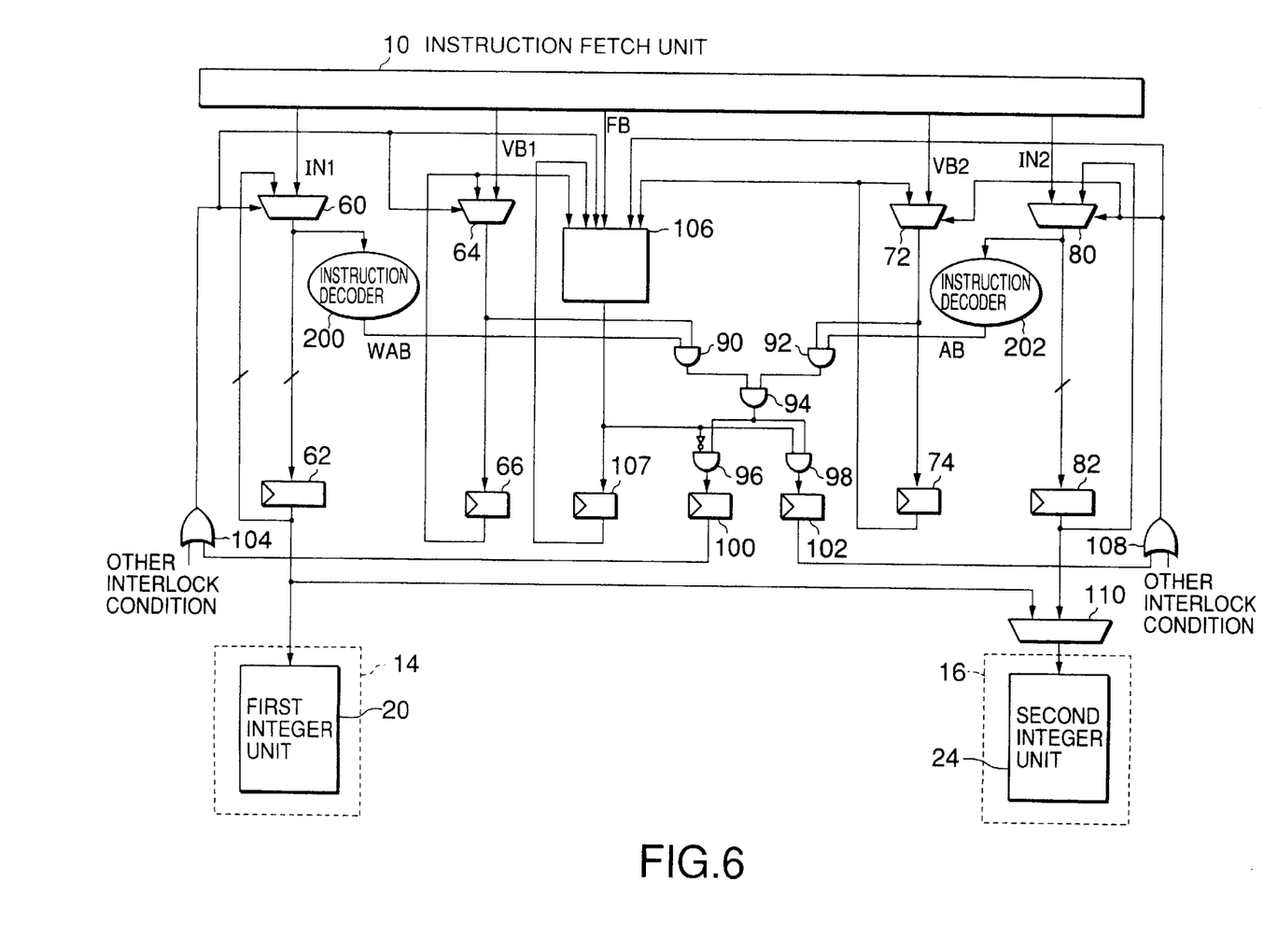
FIG. 6 is a diagram showing a modified control circuit for controlling the instruction system in the present invention.

Furthermore, the embodiment has been explained with reference to FIG. 4 as generating the first valid bit VB1 second valid bit VB2, wide ALU bit WAB and ALU bit AB by pre-decoding an instruction when the instruction fetch unit 10 fetches the instruction and write it into the internal cache memory, so as to output them from the instruction fetch unit 10. However, it may be modified as shown in FIG. 6, where instruction decoders 200 and 202 take the first instruction signal IN1 and the second instruction signal IN2 output from the instruction fetch unit 10, and decode them to generate the wide ALU bit WAB and the ALU bit AB. However, the embodiment shown in FIG. 4 is more advantageous to generate the first interlock signal IL1 and the second interlock signal IL2 earlier because the wide ALU bit WAB and the ALU bit AB are pre-decoded.

Furthermore, although the embodiment has been explained as using an in-order processor which operates operating instructions in their issued sequence, the invention is applicable to an out-of-order processor which executes operating instructions regardless their issued sequence. That is, the invention is applicable to a processor that operated to use any available operating unit in the first pipeline 14 and the second pipeline 16 regardless of the issued order of operating instructions.

What is claimed is:

1. A processor comprising:

a first pipeline having a first operating unit for executing a first operation;

a second pipeline having a second operating unit separated from said first operating unit and for executing the same type of operation as that of said first operation, and a third operating unit for executing an operation of a type different from that of said first operation;

an instruction fetch unit which issues to said first pipeline a first operating instruction to be executed by using one of said operating units in said first pipeline and said second pipeline and a second operating instruction to be executed by using said first operating unit in said first pipeline and one of said operating units in said second pipeline, and issues said first operating instruction to said second pipeline; and a control circuit activated when said instruction fetch unit issues to said first pipeline said second operating instruction to be executed by using said first operating unit and said second operating unit, and simultaneously issues to said second pipeline said first operating instruction to be executed by using said second operating unit to make control such that said first operating instruction is executed preferentially while holding said second operating instruction in wait if said first operating instruction is issued earlier than said second operating instruction, or said second operating instruction is executed preferentially while holding said first operating instruction in wait if said second operating instruction is issued earlier than said first operating instruction, said control circuit including an instruction system control circuit for controlling instruction system in said first operation instruction and said second operating instruction, and said instruction system control circuit including:

an interlock signal generating circuit for outputting a first interlock signal when holding said first operating instruction or said second operating instruction issued to said first pipeline in wait, and for outputting a second interlock signal when holding said first operating instruction issued to said second pipeline in wait;

a first instruction hold/output circuit responsive to said first interlock signal to hold or output said first operating instruction or said second operating instruction issued to said first pipeline; and a second instruction hold/output circuit responsive to said second interlock signal to hold or output said first operating instruction issued to said second pipeline.

2. The processor according to claim 1 wherein, when said control circuit holds said first operating instruction or said second operating instruction, said control circuit makes control such that said first operating instruction or said second operating instruction held in wait is executed in the next cycle.

3. The processor according to claim 1 wherein said control circuit further includes an operand system control circuit for controlling operands in said first operating instruction and said second operating instruction.

4. The processor according to claim 1 wherein said interlock signal generating circuit includes:
   a first valid signal hold/output circuit supplied with a first valid signal indicative of effectiveness of an instruction issued to said first pipeline, and responsive to said first interlock signal to hold or output said first valid signal;
   a second operating instruction issue signal hold/output circuit supplied with a second operating instruction issue signal indicative of issuance of said second operating instruction to said first pipeline, and responsive to said first interlock signal to hold or output said second operating, instruction issue signal;
   a second valid signal hold/output circuit supplied with a second valid signal indicative of effectiveness of an instruction issued to said second pipeline, and responsive to said second interlock signal to hold or output said second valid signal;
   a first operating instruction issue signal hold/output circuit supplied with a first operating instruction issue signal indicative of issuance of said first operating instruction to said second pipeline, and responsive to said second interlock signal to hold or output said first operating instruction issue signal;
   a state signal for outputting a first signal for interlock, which is supplied with a first signal indicating whether the instruction issued to said first pipeline is earlier or later than the instruction issued to said second pipeline, and supplied with said first interlock signal, said second interlock signal, said first valid signal, said second valid signal and said first signal for interlock of a preceding cycle; and
   a combinational logic circuit supplied with said first valid signal, said second valid signal, said first operating instruction issue signal, said second operating instruction issue signal and said first signal for interlock to output said first interlock signal and said second interlock signal.

5. The processor according to claim 4 wherein said state circuit outputs said first signal for interlock in a subsequent cycle in an inverted form from a preceding cycle when said first valid signal and said second valid signal were effective in the preceding cycle, and one of said first interlock signal and said second interlock signal was interlocked in the preceding cycle.

6. The processor according to claim 4 wherein said state circuit outputs said first signal for interlock in a subsequent cycle in the same form as a preceding cycle when said first valid signal and said second valid signal were effective in the preceding cycle, and both of said first interlock signal and said second interlock signal were interlocked in the preceding cycle.

7. The processor according to claim 3 wherein said operand system control circuit includes:
   a first operand hold/output circuit for holding operands for said first operating instruction or said second operating instruction issued to said first pipeline or for outputting them to said first operating unit;
   a second operand hold/output circuit for holding operands for said first operating instruction issued to said second pipeline or for outputting them to said second operating unit; and
   a third operand hold/output circuit activated when the instruction issued to said first pipeline is said second operating instruction to hold operands for said second operating instruction to be executed in said second operating unit or to output them to said second operating unit.

8. The processor according to claim 7 wherein said first operand hold/output circuit includes:
   a first multiplexer supplied with operands from a register file and operands fed back from its own output to select and output operands fed back to its own output upon holding the instruction issued to said first pipeline in wait or to select and output operands from the register file upon executing the instruction issued to said first pipeline; and
   a first flip-flop for holding operands output from said first multiplexer and outputting them to said first operating unit,
   wherein said second operand hold/output circuit includes:
   a second multiplexer supplied with operands from a register file and operands fed back from its own output to select and output operands fed back from its own output upon holding the instruction issued to said second pipeline in wait or to select and output operands from the register file upon executing the instruction issued to said second pipeline;
   a second flip-flop for holding and outputting operands output from said second multiplexer; and
   a third multiplexer supplied with operands output from said second flip-flop and operands output from said third operand hold/output circuit to select operands output from said third operand hold/output circuit and output them to said second operating unit upon executing said second operating instruction or to select operands output from said second flip-flop and output them to said second operating unit upon executing the instruction issued to said second pipeline, and
   wherein said third operand hold/output circuit includes:
   a fourth multiplexer supplied with operands from a register file and operands fed back from its own output to select and output operands fed back from its own output upon holding said second operating instruction issued to said first pipeline in wait or to select and output operands from the register file upon executing said second operating instruction issued to said first pipeline; and
   a third flip-flop for holding operands output from said fourth multiplexer and outputting them to said third multiplexer.

9. The processor according to claim 1 wherein said first operating unit and said second operating unit are integer units.

10. The processor according to claim 1 wherein said third operating unit is a load store unit, a co-processor unit, or a floating point unit.

11. A processor comprising:
    a first pipeline having a first operating unit for executing a first operation and a second operating unit for executing a second operation;
    a second pipeline having a third operating unit for executing a third operation and a fourth operating unit for executing a fourth operation;
    an instruction fetch unit which issues to one of said first pipeline and said second pipeline a first operating instruction to be operated by using one of said operating units in said first pipeline and said second pipeline and a second operating instruction to be operated by using one of said first operating units in said first pipeline and one of said operating units in said second pipeline, and issues said first operating instruction to the other of said first pipeline and said second pipeline; and a control circuit activated when the first operating instruction issued from said instruction fetch unit to one of said first pipeline and said second pipeline and the second operating instruction issued from said instruction fetch unit to the other of said first pipeline and said second pipeline need a common operating unit to make control such that said first operating instruction is executed preferentially while holding said second operating instruction in wait if said first operating instruction is issued earlier than said second operating instruction, or said second operating instruction is executed preferentially while holding said first operating instruction in wait if said second operating instruction is issued earlier than said first operating instruction, said control circuit including an instruction system control circuit for controlling instruction system in said first operating instruction and s second operating instruction, and said instruction system control circuit including:

an interlock signal generating circuit for outputting a first interlock signal when holding said first operating instruction or said second operating instruction issued to said first pipeline in wait, and for outputting a second interlock signal when holding said first operating instruction issued to said second pipeline in wait;

a first instruction hold/output circuit responsive to said first interlock signal to hold or output said first operating instruction or said second operating instruction issued to said first pipeline; and a second instruction hold/output circuit responsive to said second interlock signal to hold or output said first operating instruction issued to said second pipeline.

12. The processor according to claim 11 wherein, when said control circuit holds said first operating instruction or said second operating instruction, said control circuit makes control such that said first operating instruction or said second operating instruction held in wait be executed in the next cycle.

13. The processor according to claim 11 wherein said control circuit further includes an operand system control circuit for controlling operands in said first operating instruction and said second operating instruction.

14. A processor comprising:
a first pipeline having a first operating unit for executing a first operation;
a second pipeline having a second operating unit separated from said first operating unit and for executing the same type of operation as that of said first operation, and a third operating unit for executing an operation of a type different from that of said first operation;
an instruction fetch unit which issues to said first pipeline a first operating instruction to be operated by using one of said operating units in said first pipeline and said second pipeline and a second operating instruction to be operated by using said first operating unit in said first pipeline and one of said operating units in said second pipeline, and issues said first operating instruction to said second pipeline; and
a control circuit activated when said instruction fetch unit issues to said first pipeline said second operating instruction to be operated by using said first operating unit and said second operating unit, and simultaneously issues to said second pipeline said first operating instruction to be operated by using said second operating unit to make control such that one of said first operating instruction and said second operating instruction is held in wait while preferentially executing the other, said control circuit including an instruction system control circuit for controlling instruction system in said first operating instruction and said second operating instruction, and said instruction system control circuit including:

an interlock signal generating circuit for outputting a first interlock signal when holding said first operating instruction or said second operating instruction issued to said first pipeline in wait, and for outputting a second interlock signal when holdings said first operating instruction issued to said second pipeline in wait;

a first instruction hold/output circuit responsive to said first interlock signal to hold or output said first operating instruction issued to said first pipeline; and a second instruction hold/output circuit responsive to said second interlock signal to hold or output said first operating instruction issued to said second pipeline.

15. The processor according to claim 14 wherein, when said control circuit holds said first operating instruction or said second operating instruction, said control circuit makes control such that said first operating instruction or said second operating instruction held in wait be executed in the next cycle.

16. The processor according to claim 14 wherein said control circuit further includes an operand system control circuit for controlling operands in said first operating instruction and said second operating instruction.

17. A processor comprising
a first pipeline having a first operating unit for executing a first operation;
a second pipeline having a second operating unit separated from said first operating unit and for executing the same type of operation as that of said first operation, and a third operating unit for executing an operation of a type different from that of said first operation;
an instruction fetch unit which issues to said first pipeline a first operating instruction to be executed by using one of said operating units in said first pipeline and said second pipeline and a second operating instruction to be executed by using said first operating unit in said first pipeline and one of said operating units in said second pipeline, and issues said first operating instruction to said second pipeline; and
a control circuit activated when said instruction fetch unit issues to said first pipeline said second operating instruction to be executed by using said first operating unit and said second operating unit, and simultaneously issues to said second pipeline said first operating instruction to be executed by using said second operating unit to make control such that said first operating instruction is executed preferentially while holding said second operating instruction in wait if said first operating instruction is issued earlier than said second operating instruction, or said second operating instruction is executed preferentially while holding said first operating instruction in wait if said second operating instruction is issued earlier than said first operating instruction, said control circuit including an operand system control circuit for controlling operands in said first operating instruction and said second operating instruction, and said operand system control circuit including;

a first operand hold/output circuit for holding operands for said first operating instruction or said second operating instruction issued to said first pipeline or for outputting them to said first operating unit;

a second operand hold/output circuit for holding operands for said first operating instruction issued to said second pipeline or for outputting them to said second operating unit; and a third operand hold/output circuit activated to hold operands for said second operating instruction to be executed in said second operating unit or to output them to said second operating unit or to output them to said second operating unit when the instruction issued to said first pipeline is said second operating instruction.

18. The processor according to claim 17 wherein said first operand hold/output circuit includes:

a first multiplexer supplied with operands from a register file and operands fed back from its own output to select and output operands fed back to its own output upon holding the instruction issued to said first pipeline in wait or to select and output operands from the register file upon executing the instruction issued to said first pipeline; and a first flip-flop for holding operands output from said first multiplexer and outputting them to said first operating unit, wherein said second operand hold/output circuit includes:

a second multiplexer supplied with operands from a register file and operands fed back from its own output to select and output operands fed back from its own output upon holding the instruction issued to said second pipeline in wait or to select and output operands from the register file upon executing the instruction issued to said second pipeline;

a second flip-flop for holding and outputting operands output from said second multiplexer; and a third multiplexer supplied with operands output from said second flip-flop and operands output from said third operand hold/output circuit to select operands output from said third operand hold/output circuit and output them to said second operating unit upon executing said second operating instruction or to select operands output from said second flip-flop and output them to said second operating unit upon executing the instruction issued to said second pipeline, and wherein said third operand hold/output circuit includes:

a fourth multiplexer supplied with operands from a register file and operands fed back from its own output to select and output operands fed back from its own output upon holding said second operating instruction issued to said first pipeline in wait or to select and output operands from the register file upon executing said second operating instruction issued to said first pipeline; and a third flip-flop for holding operands output from said fourth multiplexer and outputting them to said third multiplexer.

* * * * *